United States Patent
Jang (10) Patent No.: US 10,728,746 B2
(45) Date of Patent: Jul. 28, 2020

(54) CONTROL METHOD FOR MOBILE DATA SHARING AND VEHICLE PROVIDING THE SAME

(71) Applicants: HYUNDAI MOTOR COMPANY, Seoul (KR); KIA MOTORS CORPORATION, Seoul (KR)

(72) Inventor: JaeMin Jang, Pohang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/199,920

(22) Filed: Nov. 26, 2018

(65) Prior Publication Data

US 2020/0092713 A1  Mar. 19, 2020

(30) Foreign Application Priority Data

Sep. 19, 2018 (KR) .................. 10-2018-0111865

(51) Int. Cl.
| | | |
|---|---|---|
| *H04W 8/24* | (2009.01) | |
| *H04W 72/12* | (2009.01) | |
| *H04W 12/08* | (2009.01) | |
| *H04W 4/40* | (2018.01) | |
| *H04W 48/10* | (2009.01) | |
| *H04W 48/20* | (2009.01) | |

(52) U.S. Cl.
CPC ............... *H04W 8/24* (2013.01); *H04W 4/40* (2018.02); *H04W 12/08* (2013.01); *H04W 48/10* (2013.01); *H04W 48/20* (2013.01); *H04W 72/1247* (2013.01)

(58) Field of Classification Search
None
See application file for complete search history.

(56) References Cited

U.S. PATENT DOCUMENTS

| | | | | |
|---|---|---|---|---|
| 9,203,838 | B2* | 12/2015 | Kuscher ................ | H04W 12/08 |
| 2002/0061744 | A1* | 5/2002 | Hamalainen ........... | H04W 4/18 |
| | | | | 455/41.2 |
| 2006/0040705 | A1* | 2/2006 | Kawakami ............ | H04L 45/122 |
| | | | | 455/561 |
| 2008/0268855 | A1* | 10/2008 | Hanuni ............. | H04W 72/0406 |
| | | | | 455/445 |
| 2009/0186608 | A1* | 7/2009 | Lee ..................... | H04M 1/6025 |
| | | | | 455/416 |
| 2011/0294502 | A1* | 12/2011 | Oerton .................. | H04W 72/10 |
| | | | | 455/426.1 |
| 2013/0138714 | A1* | 5/2013 | Ricci ..................... | B60K 37/06 |
| | | | | 709/201 |
| 2014/0080533 | A1* | 3/2014 | Tabrizi ................. | H04W 72/08 |
| | | | | 455/513 |

(Continued)

*Primary Examiner* — Jamaal Henson
(74) *Attorney, Agent, or Firm* — Morgan, Lewis & Bockius LLP (57) ABSTRACT

A method of controlling mobile data sharing, performed by a computing device, may include transmitting a signal to request terminal information for sharing data to a plurality of terminals and receiving the terminal information from the plurality of terminals, determining an order of priority to assign a status of a host terminal and a status of a client terminal using the terminal information, and providing access information for connecting the client terminal to the host terminal on the basis of the determined order of priority.

15 Claims, 10 Drawing Sheets

(56) References Cited

U.S. PATENT DOCUMENTS

2014/0080534 A1* 3/2014 Farhadi ................ H04W 88/04
 455/513
2015/0358851 A1* 12/2015 Toda .................... H04W 40/32
 370/311

* cited by examiner

| | DEVICE NAME | RESIDUAL DATA (AS OF JUNE, 2018) | TETHERING (DESIGNATION POSSIBLE) |
|---|---|---|---|
| 1 | Garaxy Note 8 | 2.4G | ○ |
| 2 | Ifhone X | 0.7G | |
| 3 | LJ G7 | 1.2G | |

HOT-SPOT ACTIVATION COMMAND

CONTROL METHOD FOR MOBILE DATA SHARING AND VEHICLE PROVIDING THE SAME

CROSS-REFERENCE TO RELATED APPLICATION

This application is based on and claims the benefit of priority to Korean Patent Application No. 10-2018-0111865, filed on Sep. 19, 2018 in the Korean Intellectual Property Office, the disclosure of which is incorporated herein by reference.

TECHNICAL FIELD

The present disclosure relates to a control method for mobile data sharing, capable of connecting a plurality of terminals to each other to share mobile data therebetween, and a vehicle therefor.

BACKGROUND

A smartphone performs communication using at least one of Wi-Fi data and mobile data. Here, the Wi-Fi data represents data provided to a smartphone within a certain distance using radio waves in a place where an access point (AP) is installed, and mobile data represents data provided to a smartphone using radio waves according to a specific frequency even in a place where an access point is not installed. In this case, the usage limit of mobile data is determined according to the contents or fees of service provided by a mobile service company.

Meanwhile, in the case of a vehicle without an access point capable of providing Wi-Fi data, for example, when there are a plurality of smartphone users in a specific space, data may be shared between the smartphones by executing a mobile hot-spot function or a Blue-Tooth tethering function.

In this case, there is a method of sharing data of an occupant who has a large amount of residual data with other occupants indoors. However, the method requires to check the amount of residual data individually and change the setting of the smartphone, resulting in distraction of the driver and an accident.

In order to remove the above described limitations, a method of performing processes of connecting smartphones for data sharing all at once, and various apparatuses for using the method are provided.

SUMMARY

One of the objects of the present disclosure is to provide a control method capable of omitting checking and setting processes that are required to share data between smart phones and automatically providing a connecting service, and a vehicle providing the same.

Additional aspects of the disclosure will be set forth in part in the description which follows and, in part, will be obvious from the description, or may be learned by practice of the disclosure.

Therefore, it is an aspect of the present disclosure to provide a control method for mobile data sharing including: transmitting a signal to request terminal information for sharing mobile data to a plurality of terminals, and receiving the terminal information from the plurality of terminals; determining an order of priority to assign a status of a host terminal and a status of a client terminal using the terminal information; and providing access information for connecting the client terminal to the host terminal such that the client terminal receives mobile data shared by the host terminal on the basis of the determined order of priority.

The terminal information may include at least one of data usage, residual data, and data limit of each of the plurality of terminals.

The receiving of the terminal information may include: automatically receiving the terminal information from the plurality of terminals in which a specific application is installed.

The determining of the order of priority may include: determining the order of priority according to residual data of each of the plurality of terminals; and selecting a terminal assigned a first priority among the plurality of terminals as the host terminal.

The providing of the access information may further include transmitting a hot-spot activation command to the selected host terminal.

The providing of the access information may further include transmitting hot-spot information of the selected host terminal.

The determining of the order of priority may include: determining an order of priority on the basis of residual data of each of the plurality of terminals; and selecting at least one terminal assigned a priority other than the first priority among the plurality of terminals as the client terminal.

The providing of the access information may further include transmitting hot-spot information of the host terminal to the selected client terminal.

The access information may include at least one of identification (ID) information or password information of the host terminal.

The providing of the access information may include controlling the access information to be displayed on a display.

The providing of the access information may include displaying the access information of the host terminal to be automatically displayed on the client terminal.

It is another aspect of the present disclosure to provide a control method for data sharing further including: checking residual data of each of the client terminal and the host terminal after the client terminal is connected to the host terminal on the basis of the access information.

It is another aspect of the present disclosure to provide a control method for data sharing further including generating a signal to switch the status of the host terminal when it is sensed as a result of the checking, that the residual data of the host terminal has dropped to be less than the residual data of the at least one client terminal.

It is another aspect of the present disclosure to provide a control method for data sharing further including generating a signal to release connection of the client terminal to the host terminal when it is sensed as a result of the checking, that the residual data of the host terminal has dropped to be less than the residual data of the at least one client terminal.

It is an aspect of the present disclosure to provide a vehicle including: a communicator configured to transmit a signal to request terminal information for sharing mobile data to a plurality of terminals, and receive the terminal information from the plurality of terminals; a controller configured to determine an order of priority to assign a status of a host terminal and a status of a client terminal using the terminal information; and a display configured to display access information for connecting the client terminal to the host terminal such that the client terminal receives data shared by the host terminal, on the basis of the determined order of priority.

It is an aspect of the present disclosure to provide an electronic device including: a memory in which one or more instructions are stored; and a processor configured to execute the stored instructions, wherein the processor is configured to: transmit a signal to request terminal information for sharing data to a plurality of terminals, and receive the terminal information from the plurality of terminals; determine an order of priority to assign a status of a host terminal and a status of a client terminal using the terminal information; and provide access information for connecting the client terminal to the host terminal such that the client terminal receives data shared by the host terminal, on the basis of the determined order of priority.

It is an aspect of the present disclosure to provide a computer program stored in a non-transitory recording medium to execute, in combination with a computing device, steps including: transmitting a signal to request terminal information for sharing data to a plurality of terminals, and receiving the terminal information from the plurality of terminals; determining an order of priority to assign a status of a host terminal and a status of a client terminal using the terminal information; and providing access information for connecting the client terminal to the host terminal such that the client terminal receives data shared by the host terminal, on the basis of the determined order of priority.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

As used herein, the singular forms "a," "an" and "the" are intended to include the plural forms as well, unless the context clearly indicates otherwise.

The terms, such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for convenience of explanation, but not to limit an order of the steps. Thus, unless the context clearly dictates otherwise, the written order may be practiced otherwise.

Hereinafter, a control method for mobile data sharing and a vehicle providing the same according to an aspect will be described in detail with reference to the accompanying drawings.

Figure 1:
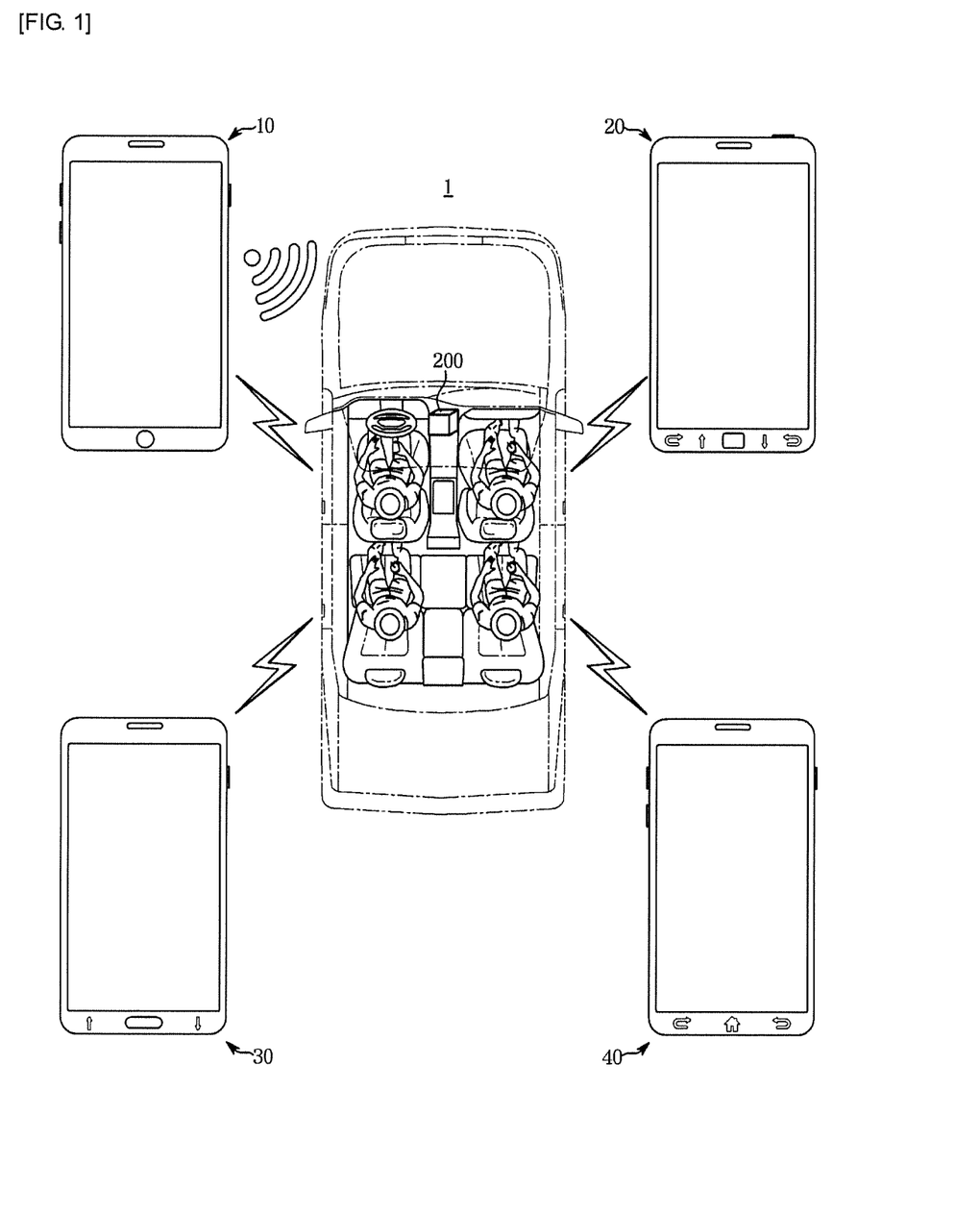
FIGS. 1 and 2 are views for describing a relationship among a plurality of terminals that share mobile data in a vehicle.
Figure 2:
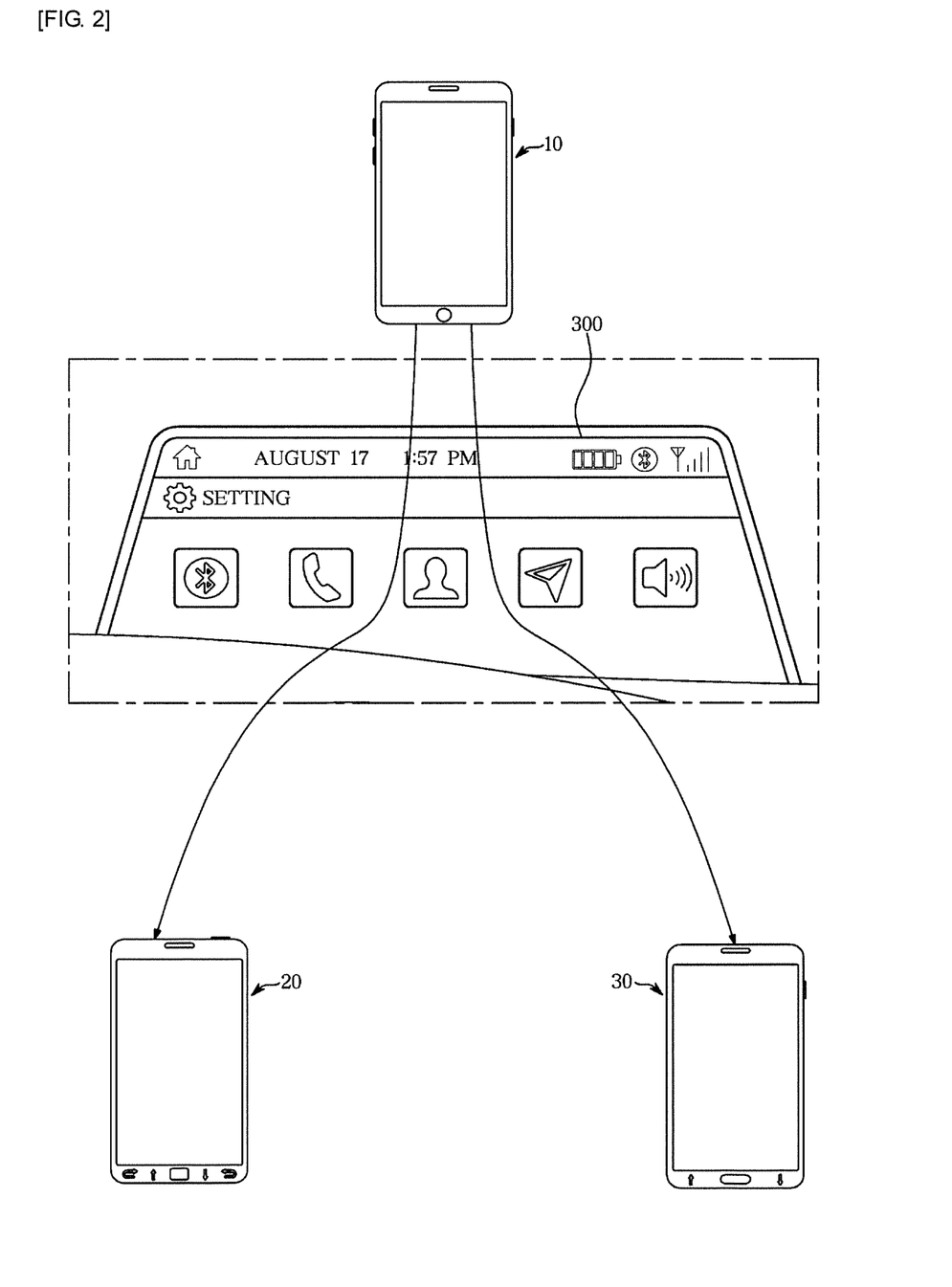

FIGS. 1 and 2 are views for describing a relationship among a plurality of terminals that share mobile data in a vehicle.

FIG. 1 illustrates a configuration and operation of a system implemented for a control method for mobile data sharing according to an embodiment of the present disclosure. The following descriptions are only an exemplary embodiment for illustrative purposes and it should be understood that some components may be added or omitted if required. Referring to FIG. 1, the system implemented for the method according to the embodiment includes a plurality of terminals 10, 20, 30, and 40 and a controller 200 provided in a vehicle 1.

The plurality of terminals 10, 20, 30, and 40 may represent a computing device, such as a smartphone, a tablet PC, a notebook computer, and the like, including an electronic device that performs data communication. Referring to FIG. 1, the plurality of terminals 10, 20, 30, and 40 are illustrated as smart phones. Here, mobile data indicates data consumed by a terminal to independently perform Internet communication even in a place where an access point (AP) is not installed. The usage limit of mobile data may be determined according to the contents and fees of service provided a mobile service company.

The controller 200 may be provided in the vehicle 1 and may determine the order of priority on the basis of terminal information received by a communicator (not shown) that may perform bi-directional communication with the plurality of terminals 10, 20, 30, and 40. The controller 200 may assign a status as a host terminal or a client terminal to the plurality of terminals 10, 20, 30, and 40 on the basis of the determined order of priority. The host terminal represents a terminal that provides mobile data, and the client terminal represents a terminal that receives the mobile data from the host terminal. The above-described terminal information will be further described below with reference to FIG. 5.

Here, the order of priority represents a classification in which a terminal providing mobile data and a terminal receiving mobile data are divided among the plurality of terminals 10, 20, 30, and 40 desiring to share mobile data.

The criterion for determining the order of priority may be based on various pieces of information. For example, the order of priority may be determined on the basis of the amount of residual data of each of the plurality of terminals. In addition, the order of priority may be determined according to a setting of an owner of the vehicle or settings of users of the terminals. For example, a specific terminal may be set to always have a status of a host terminal, or may be set to always be excluded from a status of a host terminal.

Referring to FIG. 2, the first terminal 10 is assigned a status of a host terminal, and the second terminal 20 and the third terminal 30 each are assigned a status of a client terminal. The status of each terminal depends on the order of priority determined by the controller 200. A display 300 may display information for connecting the at least one of the client terminals 20 and 30 to the host terminal 10 for mobile data sharing. The host terminal 10 may set a WiFi access point using a mobile hot spot. When the host terminal 10 converts the mobile hotspot to operate in an activation mode, the client terminals 20 and 30 may attempt a WiFi connection to the host terminal 30 to receive mobile data shared by the host terminal 10. In addition, the host terminal and the client terminal may share mobile data not only by the above described method but also by the bluetooth tethering method.

Figure 3:
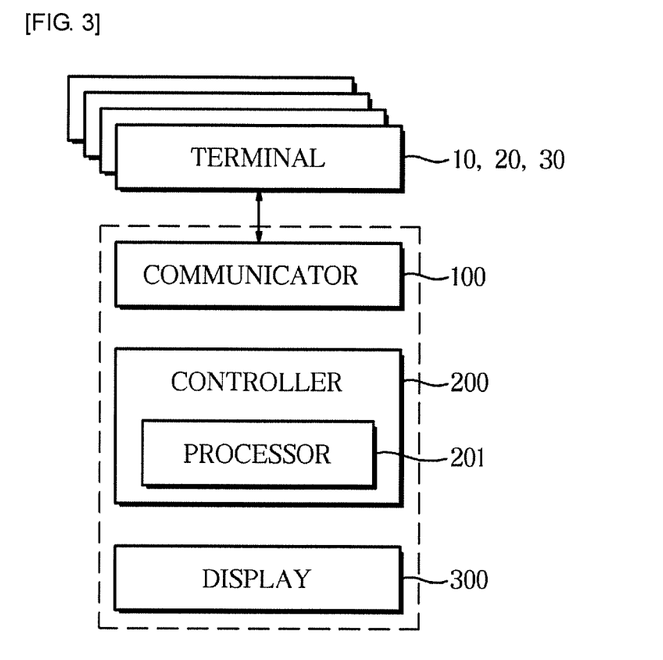
FIG. 3 is a control block diagram illustrating a vehicle according to an embodiment.

FIG. 3 is a control block diagram illustrating a vehicle according to an embodiment. Referring to FIG. 3, the vehicle 1 may communicate with a plurality of terminals 10, 20, and 30, and may include a communicator 100, a controller 200, and a display 300. Although FIG. 3 merely illustrates components related to the present embodiment, it should be understood that general components that are not shown in FIG. 3 may be included in the present disclosure. In addition, it should be noted that the components shown in FIG. 3 represent units distinguished by functions, and one or more of the components may be implemented into an integral body when they are realized in a physical environment.

The communicator 100 may be a hardware device implemented with various electronic circuits to transmit and receive signals via wireless or landline connections. The communicator 100 may perform communication to receive terminal information and access information from each of the terminals held by users in the vehicle. The terminal information represents a mobile data usage, a residual mobile data, and a mobile data limit of each terminal, and the like, that is, information required to share mobile data between the plurality of terminals. The access information represents information required to attempt an access to the host terminal that provides mobile data, upon determining the order of priority on the basis of the terminal information. For example, the access information may include ID information and password information of the host terminal.

The communicator 100 may attempt pairing with the plurality of terminals to receive the above described terminal information and access information, or may approve a request for pairing made by the plurality of terminals to maintain connection with the plurality of terminals.

The controller 200 may assign a status of a host terminal or a status of a client terminal to each of the plurality of terminals. The controller 200 may assign the status by determining the order of priority on the basis of the terminal information received by the communicator 100. Meanwhile, the controller 200 may include at least one memory (not shown) storing a program for performing operations to be described below and at least one processor 201 for executing the stored program. When the memory and the processor 201 are each provided in plural, the memories and the processors 201 may be integrated in a single chip, or may be provided at physically separated positions.

According to an embodiment, the order of priority may be determined on the basis of residual mobile data of each of the plurality of terminals. In detail, a terminal that has the largest amount of residual mobile data among the plurality of terminals and thus is assigned the first priority may be selected as a host terminal. In addition, at least one terminal not assigned the first priority may be selected as client terminals. The terminal having the largest amount of mobile data may provide mobile data to other terminals so that distribution of mobile data is maintained at a proper level.

Although the display 300 is illustrated as being provided on an upper panel of a dash board of the vehicle, the display 300 according to the present disclosure may be provided at various positions, as long as it can be visually checked by the driver and the passenger. The display 300 may provide the driver or passenger of the vehicle with various pieces of information in the form of an image, and may visually provide various pieces of information related to the state or operation of the vehicle.

The display 300 may be implemented as a navigation device generally available for use. The display 300 may be implemented as a liquid crystal display (LCD), a light emitting diode (LED), a plasma display panel (PDP), an organic light emitting diode (OLED), a cathode ray tube (CRT), or the like, and the implemented of the display 300 is not limited thereto.

The display 300 may display the terminal information received from the plurality of terminals and the access information for connecting the client terminal of the plurality of terminals to the host terminal. For example, the display 300 may display the residual mobile data of each of the plurality of terminals as well as at least one of ID information or password information, of the host terminal.

Figure 4:
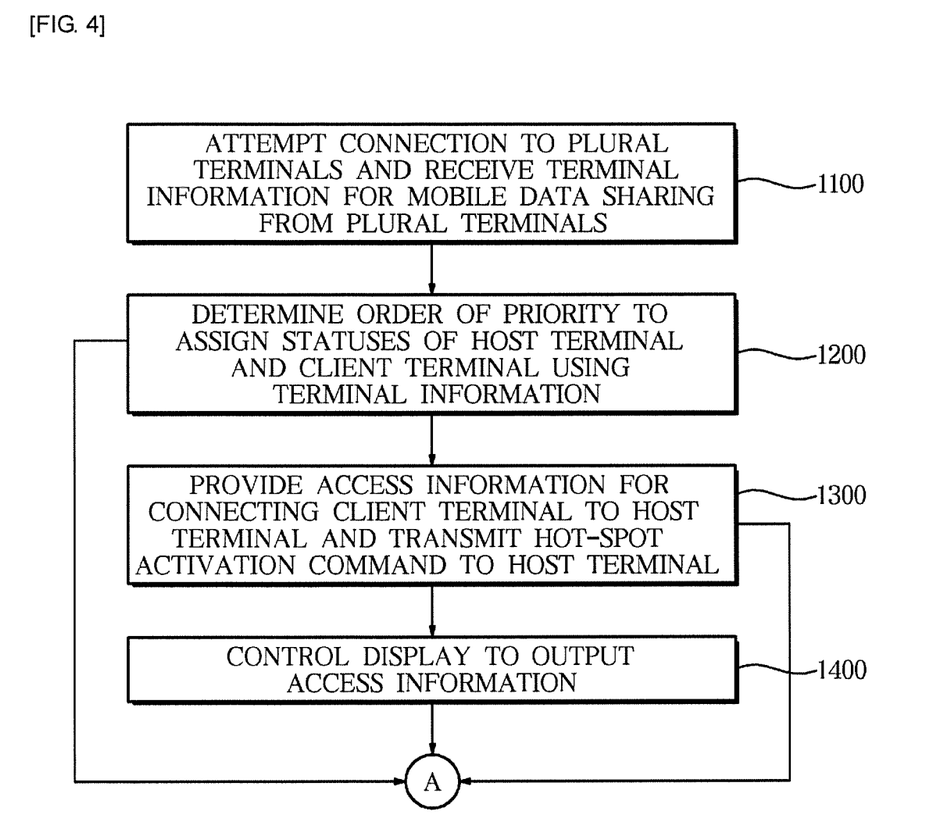
FIG. 4 is a flowchart showing a control method for mobile data sharing according to an embodiment.

FIG. 4 is a flowchart showing a control method for mobile data sharing according to an embodiment. The following descriptions are only an exemplary embodiment for illustrative purposes and it should be understood that some operations may be added or omitted if required. Meanwhile, for the sake of convenience of description, it should be noted that the agent performing each operation may be omitted.

A signal to request terminal information for sharing mobile data is transmitted to a plurality of terminals, and the terminal information is received from the plurality of terminals (1100). The signal to request terminal information may be a signal generated by sensing a terminal provided inside the vehicle by the communicator provided in the vehicle. In addition, the signal to request terminal information may be a signal that requests terminal information from a sensed terminal in the vehicle through a function of an application installed in an AVN device.

Figure 5:
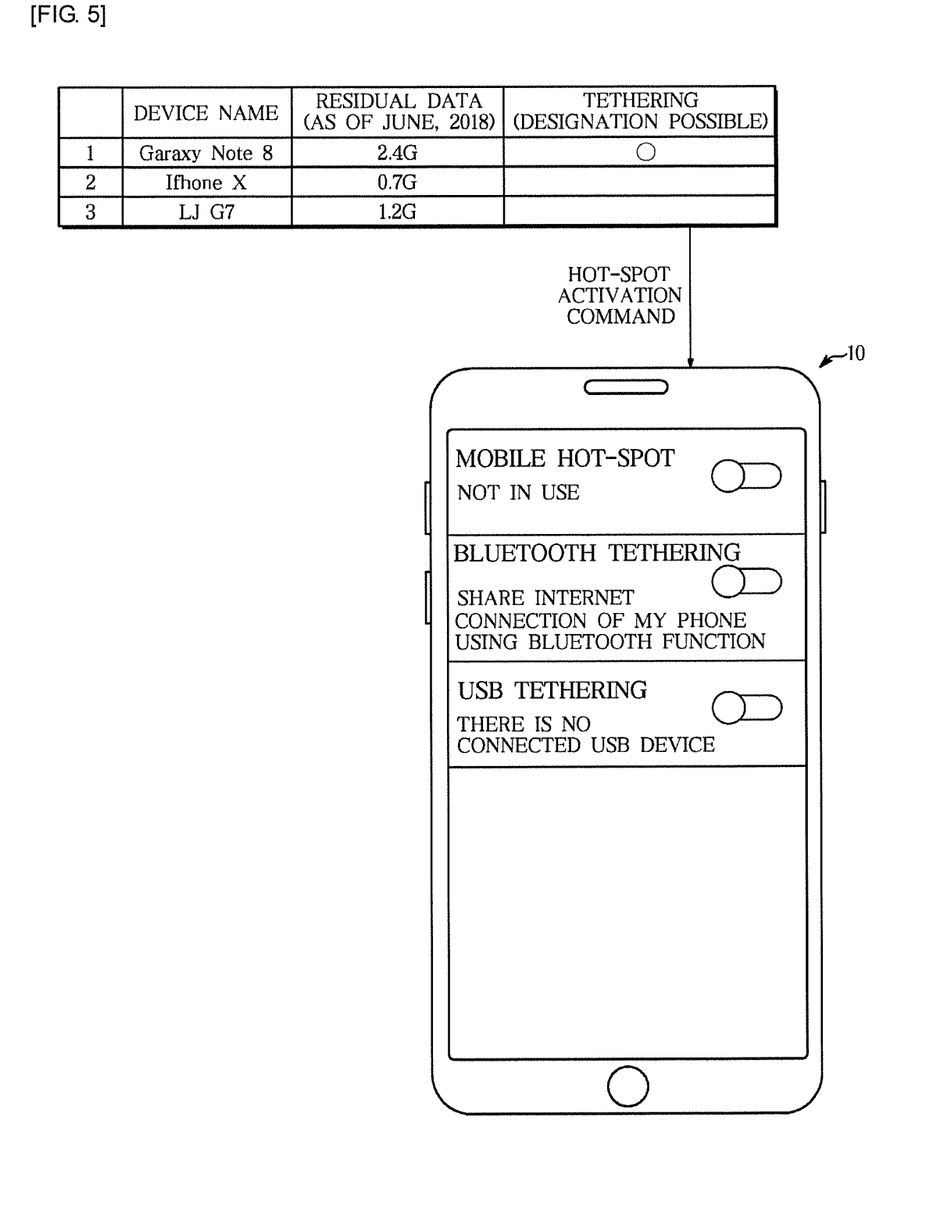
FIGS. 5 to 8 are reference diagrams for describing the flowchart shown in FIG. 4 in more detail.

The order of priority for assigning a status of a host terminal and a status of a client terminal is determined using the terminal information (1200). Referring to FIG. 5, the terminal information may include mobile data usage, residual mobile data, and mobile data usage limit, and setting regarding usage of mobile data, of each terminal.

Access information for connecting the client terminal to the host terminal is generated, and a command for activating a hot-spot function may be transmitted to the host terminal (1300).

Figure 6:
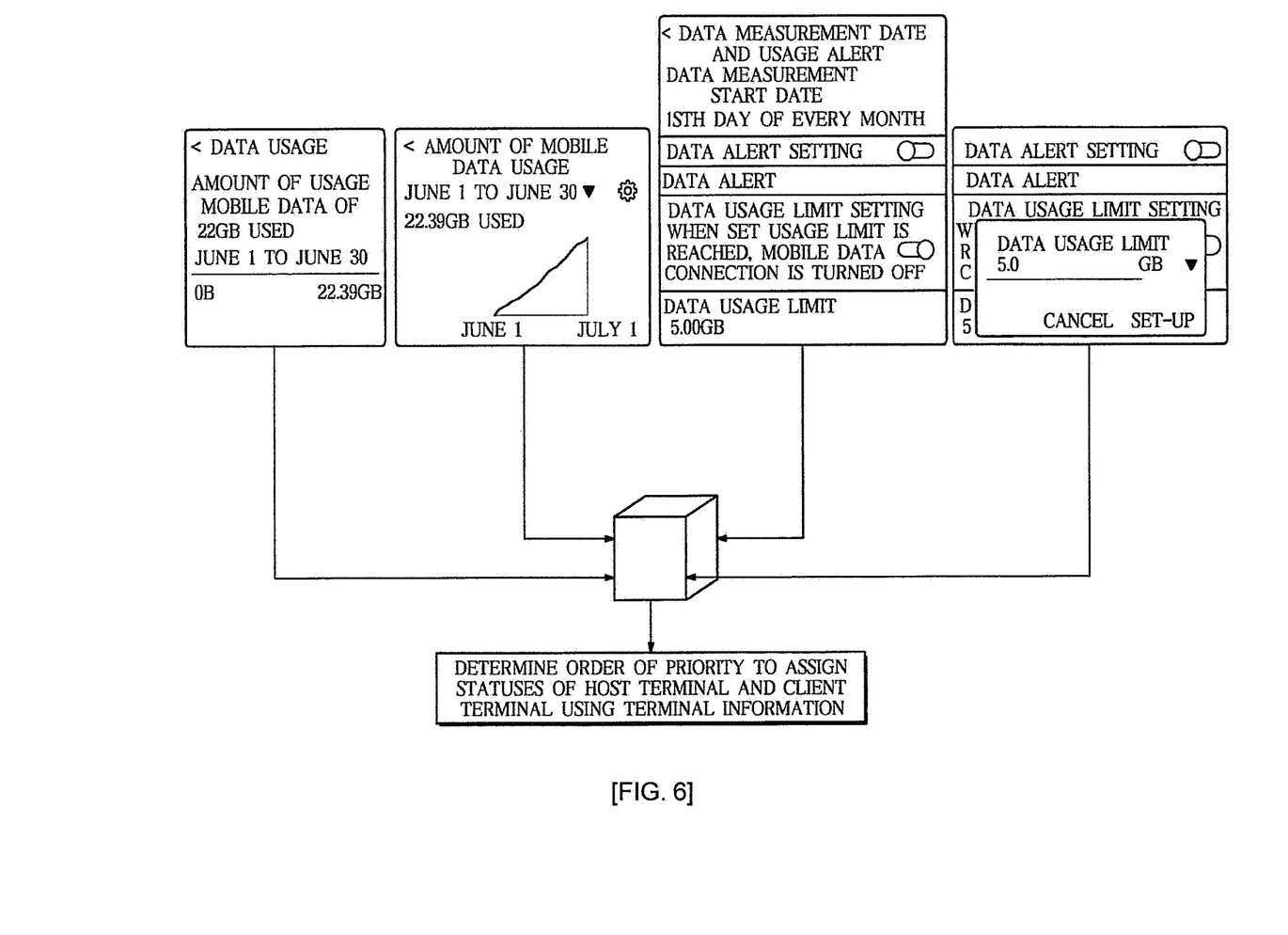

Referring to FIG. 6, when a terminal having the largest amount of residual mobile data of 2.4 G among the plurality of terminals is selected as the host terminal 10, a command for activating the hotspot function is transmitted to the selected host terminal 10. Here, the user of the host terminal 10 may enter a mode for sharing mobile data with the user of the client terminal by selecting one of the mobile hotspot or the Bluetooth tethering according to his/her demand.

The display 300 may control the access information regarding the host terminal 10 to be displayed thereon. In detail, referring to FIG. 7, when the host terminal 10 activates the mobile hot-spot function, the display 300 automatically displays the ID information and the password information of the host terminal 10 in response to an activation signal. Accordingly, the user of the client terminal 20 may receive mobile data of the host terminal 10 on the basis of the access information.

Figure 7:
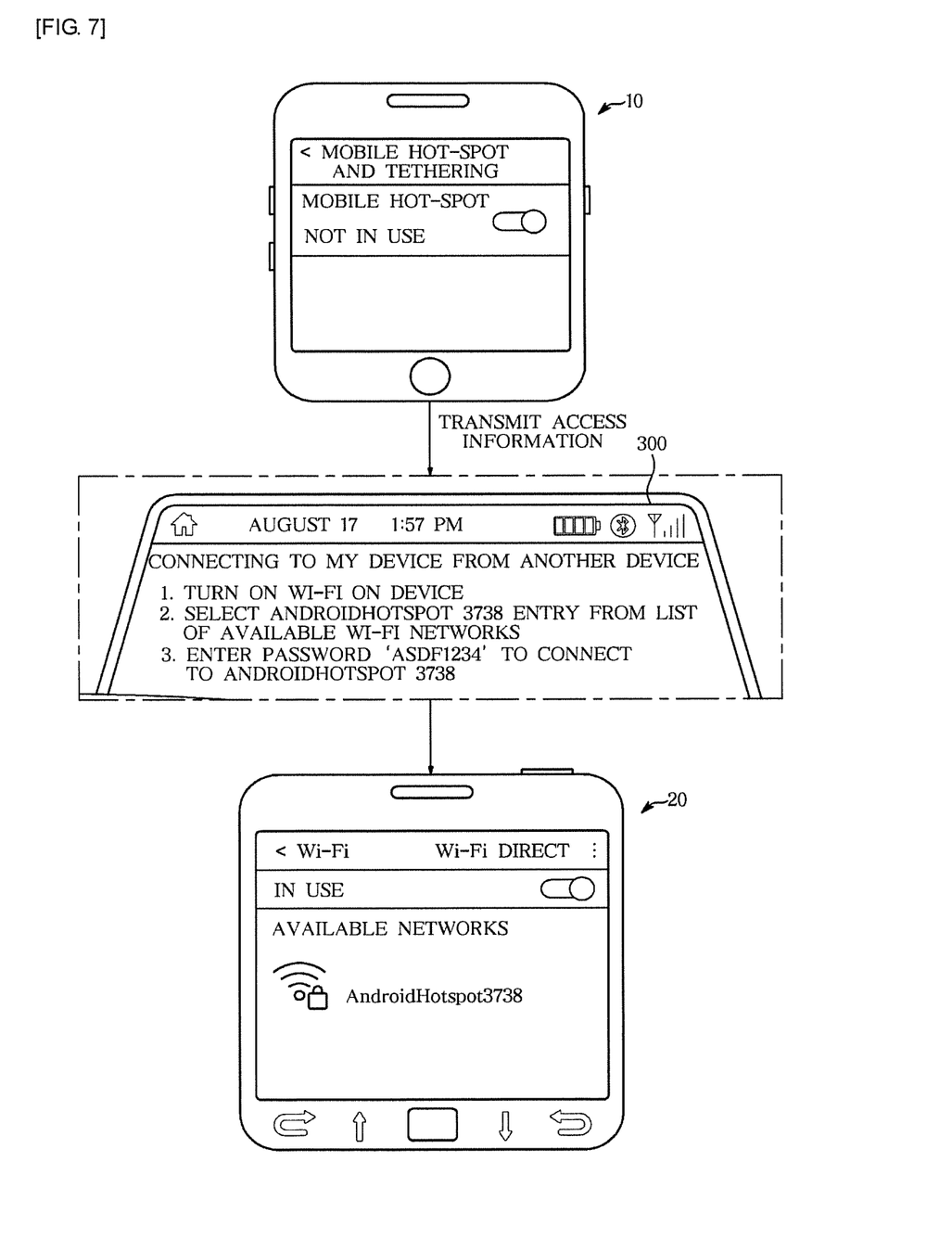
Figure 8:
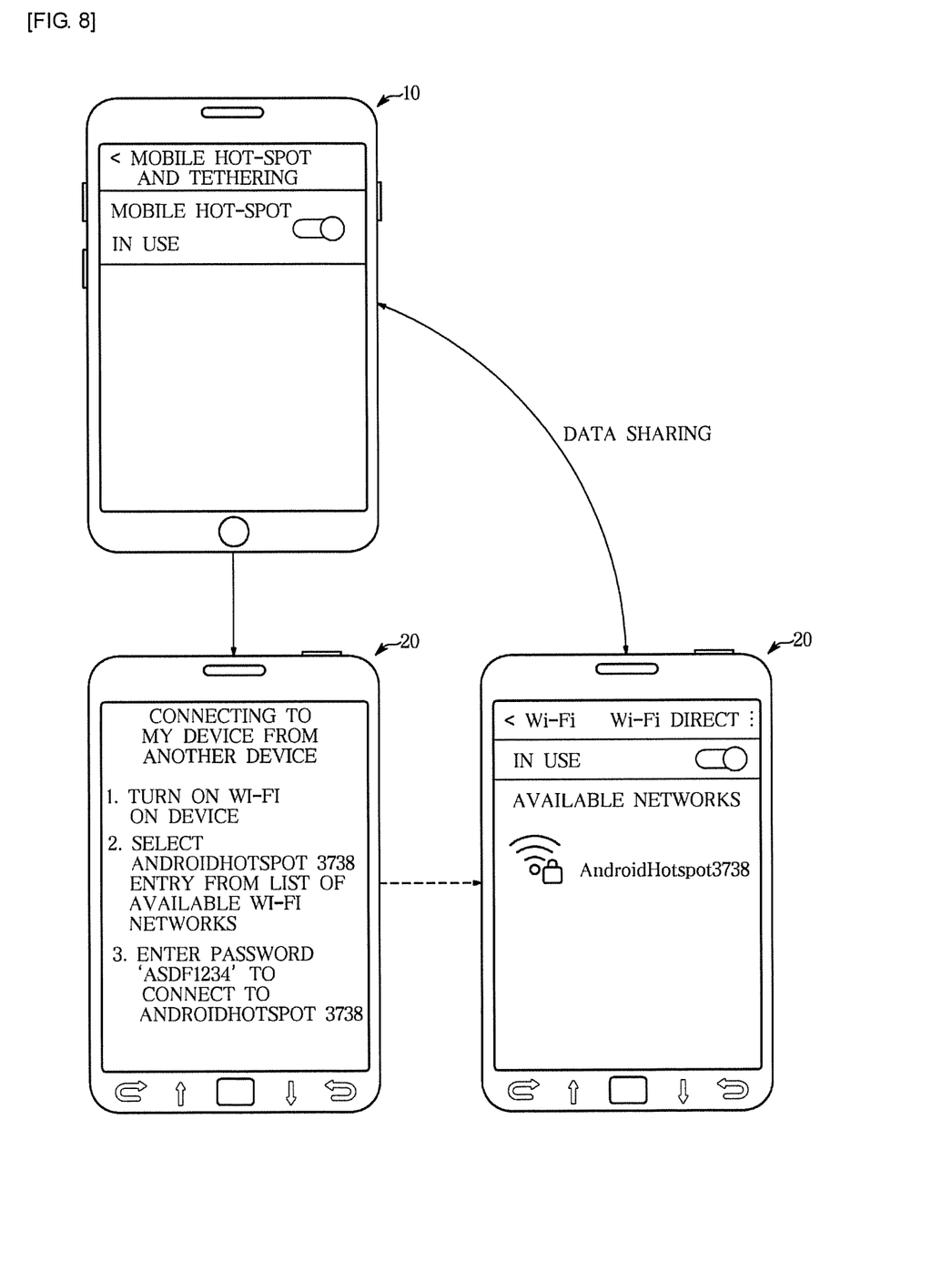

Further, different from FIG. 7, FIG. 8 illustrates an example in which access information is separately provided to the client terminal 20 rather than through the display 300. In detail, when the host terminal 10 activates the mobile hot-spot function, access information for connecting to the host terminal 10 is automatically displayed on the client terminal 20 in response to an activation signal. The user of the client terminal 20 may search for a Wi-Fi access point on the basis of the displayed access information, and receive mobile data from the host terminal 10.

Figure 9:
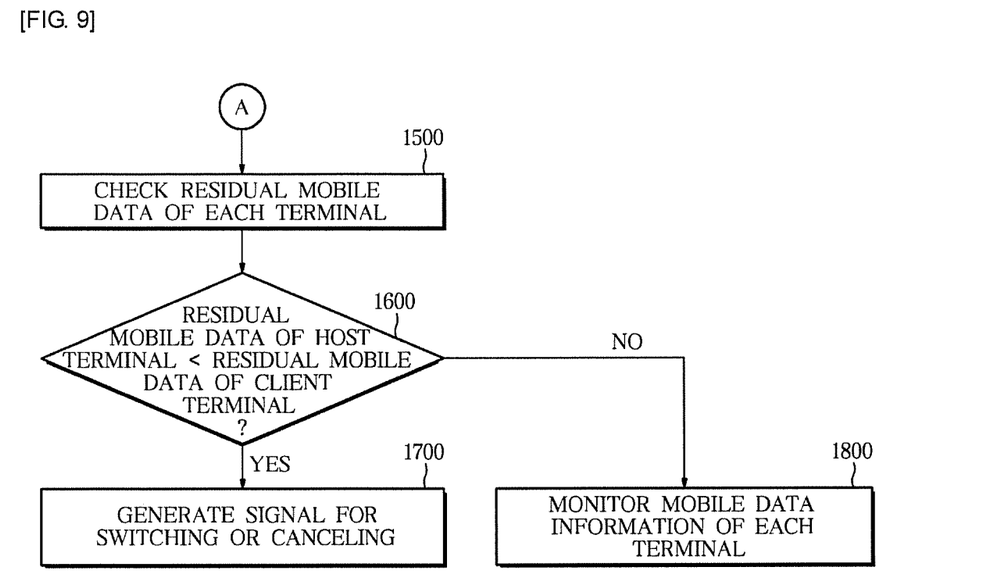
FIG. 9 is a flowchart showing a control method for mobile data sharing according to another embodiment.

FIG. 9 is a flowchart showing a control method for mobile data sharing according to another embodiment. The following descriptions are an exemplary embodiment for illustrative purposes and it should be understood that some operations may be added or omitted if required. Meanwhile, for the sake of convenience of description, it should be noted that the agent performing each operation may be omitted.

The following embodiment discloses a method of selecting a new host terminal when the residual mobile data of the host terminal decreases after the connection for mobile data sharing between the host terminal and the client terminal is made as described with reference to FIG. 4, or automatically releasing the connection when there is a possibility that the residual mobile data of the existing host terminal is insufficient. Hereinafter, the control method according to the embodiment is described in detail with reference to FIG. 9.

The residual mobile data of each terminal is checked in real time (1500). When the residual mobile data of the host terminal is less than the residual mobile data of the client terminal as a result of the checking (1600), the host terminal is determined not to be suitable for the status providing mobile data.

Accordingly, when it is sensed as a result of the checking that the residual mobile data of the host terminal has dropped to be less than the residual data of the at least one client terminal, a signal to switch the status of the host terminal may be generated (1700).

Figure 10:
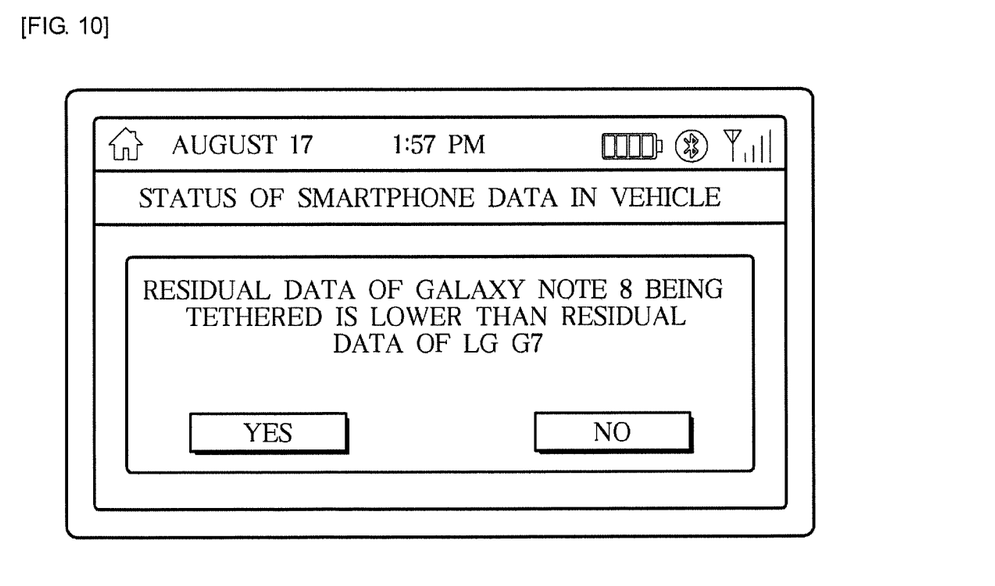
FIGS. 10 and 11 are reference diagrams for describing the flowchart shown in FIG. 9 in more detail.

For example, when it is sensed that the residual mobile data of a terminal (Galaxy Note 8) has dropped to be less than that of a terminal (LG G7), the controller may control at least one of the display and the host terminal to display a notification shown in FIG. 10.

In addition, when it is sensed as a result of the checking, that the residual mobile data of the host terminal has dropped to be less than the residual data of the at least one client terminal, a signal to release the connection may be generated (1700).

Figure 11:
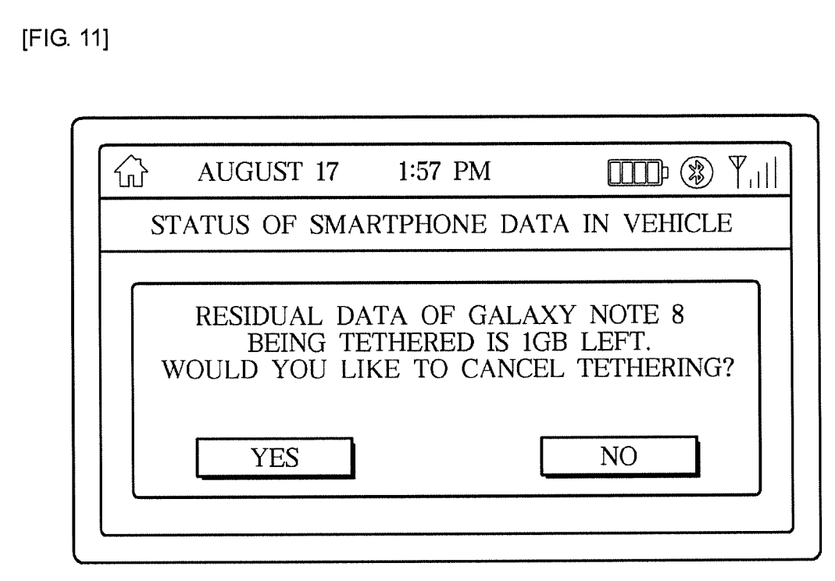

For example, when it is sensed that the residual mobile data of a terminal (Galaxy Note 8) has dropped to be less than that of a terminal (LG G7) or is less than or equal to a specific level of capacity, the controller may control at least one of the display and the host terminal to display a notification shown in FIG. 11.

Further, when the host terminal has the largest amount of residual mobile data and thus the order of priority is not changed, the controller continues monitoring the mobile data information of each terminal (1800).

The disclosed embodiments may be embodied in the form of a recording medium storing instructions executable by, for example, a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, the control method for mobile data sharing and the vehicle providing the same can omit cumbersome processes required to share mobile data between users and can automatically select a terminal having the largest amount of residual mobile data, achieving efficient mobile data sharing.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A control method for mobile data sharing, performed by a computing device, the control method comprising:
   transmitting a signal to request terminal information for sharing mobile data to a plurality of terminals, and receiving the terminal information from the plurality of terminals;
   determining an order of priority to assign a status of a host terminal and a status of a client terminal using the terminal information; and
   providing access information for connecting the client terminal to the host terminal based on the determined order of priority,
   wherein the determining an order of priority includes:
   determining the order of priority according to residual data of each of the plurality of terminals; and
   selecting a terminal assigned a first priority among the plurality of terminals as the host terminal.

2. The control method of claim 1, wherein the terminal information includes at least one of data usage, residual data, and data limit of each of the plurality of terminals.

3. The control method of claim 1, wherein the receiving the terminal information includes automatically receiving the terminal information from the plurality of terminals in which a specific application is installed.

4. The control method of claim 1, wherein the providing access information includes transmitting a hot-spot activation command to the selected host terminal.

5. The control method of claim 1, wherein the providing access information includes transmitting hot-spot information of the selected host terminal.

6. The control method of claim 1, wherein the determining an order of priority further includes:
   determining the order of priority based on the residual data of each of the plurality of terminals; and
   selecting at least one terminal assigned a priority other than the first priority among the plurality of terminals as the client terminal.

7. The control method of claim 6, wherein the providing access information includes transmitting hot-spot information of the host terminal to the selected client terminal.

8. The control method of claim 1, wherein the access information includes at least one of identification (ID) information or password information of the host terminal.

9. The control method of claim 1, wherein the providing access information includes controlling the access information to be displayed on a display.

10. The control method of claim 1, wherein the providing access information includes controlling the access information of the host terminal to be automatically displayed on the client terminal.

11. The control method of claim 1, further comprising:
checking residual data of each of the client terminal and the host terminal after the client terminal is connected to the host terminal based on the access information.

12. The control method of claim 11, further comprising generating a signal to switch the status of the host terminal when it is sensed as a result of the checking, that the residual data of the host terminal has dropped to be less than the residual data of the one client terminal.

13. The control method of claim 11, further comprising generating a signal to release connection of the client terminal to the host terminal when it is sensed as a result of the checking, that the residual data of the host terminal has dropped to be less than the residual data of the one client terminal.

14. A vehicle comprising:
a communicator configured to transmit a signal to request terminal information for sharing mobile data to a plurality of terminals, and receive the terminal information from the plurality of terminals;
a controller configured to determine an order of priority to assign a status of a host terminal and a status of a client terminal using the terminal information; and
a display configured to display access information for connecting the client terminal to the host terminal such that the client terminal receives data shared by the host terminal, based on the determined order of priority,
wherein the controller determines the order of priority according to residual data of each of the plurality of terminals and select a terminal assigned a first priority among the plurality of terminals as the host terminal.

15. A computer program stored in a non-transitory recording medium to execute, in combination with a computing device, steps comprising:
transmitting a signal to request terminal information for sharing data to a plurality of terminals, and receiving the terminal information from the plurality of terminals;
determining an order of priority to assign a status of a host terminal and a status of a client terminal using the terminal information; and
providing access information for connecting the client terminal to the host terminal such that the client terminal receives data shared by the host terminal, based on the determined order of priority,
wherein the determining an order of priority includes:
determining the order of priority according to residual data of each of the plurality of terminals; and
selecting a terminal assigned a first priority among the plurality of terminals as the host terminal.

* * * * *